Patented Apr. 18, 1939

2,154,672

UNITED STATES PATENT OFFICE 2,154,672

FORMED BODIES OF SOLID CALCIUM CHLORIDE HYDRATE

Charles R. Downs, Old Greenwich, Conn., and Joseph W. Spiselman, Mamaroneck, N. Y., assignors to Calorider Corporation, Greenwich, Conn., a corporation of Connecticut No Drawing. Original application October 12, 1935, Serial No. 44,700. Divided and this application July 20, 1938, Serial No. 220,344

6 Claims. (Cl. 23—90)

This application is a division of our prior copending application, Serial No. 44,700, filed October 12, 1935. The invention involves a new product particularly useful for the drying of air or other gases and which comprises shaped masses such as lumps, blocks, bricks, or the like of uniform composition, structure, density, size and shape, and composed primarily of solid hydrated calcium chloride. Types of apparatus and methods in which such shaped lumps or bodies may be employed are disclosed and claimed in patents of C. R. Downs 2,026,935, 2,026,936, and 2,027,094, issued January 7, 1936. Lumps of hydrated calcium chloride containing a solid deodorant are disclosed and claimed in the Downs Patent 2,027,093 issued January 7, 1936.

The last mentioned patent discloses the making of lumps composed primarily of calcium chloride dihydrate, by cooling and solidifying the molten material in a quiescent state in pans to form slabs which may be cut or scored while in a plastic state to permit later breaking of the slabs into lumps of the desired size and shape.

When molten calcium chloride hydrate is flowed into pans and cooled to room temperature and solidified in a quiescent state, the slabs which are formed are of extreme hardness but may be broken or crushed for the purpose of producing lumps. Such breaking or crushing results in the production of a large amount of fine material which is wasted or has to be reworked. Calcium chloride in a humid atmosphere, either in the form of slabs or while crushing them and handling the product, becomes moist, resulting in operating difficulties. When wet lumps of calcium chloride are stored in containers, they will become cemented together at the contact surfaces causing trouble in subsequent handling. The lumps produced not only vary in size which depends upon the screening care employed, but the shapes of lumps of approximately equivalent sizes also vary greatly and many present sharp jagged edges and corners. These edges and corners may be broken off in handling and transit, producing chips and fines which are objectionable for air conditioning purposes. If shipped in waterproof bags, the bags are often punctured by the sharp protuberances.

In order to obviate these various difficulties, numerous attempts have been made to perfect the casting of molten calcium chloride in molds. When molten calcium chloride is poured into individual molds of the size and shape of the lumps, bricks, or other forms desired, it is a difficult matter to fill each mold and yet leave no excess that has to be recovered and reworked. Difficulty is also encountered in removing the lumps from the molds and in keeping the walls of the molds free of adhering calcium chloride which interferes with subsequent molding. These various difficulties involve excessive labor costs and prohibitive investment in molds and accessory equipment. The castings produced in this way often contain shrinkage cavities and whether made in individual molds or cast in slabs which are later crushed to form lumps, the crystalline structure, composition and density may vary considerably. These variations may occur not only within a lump but also when comparing one lump with another. Some of the lumps may be primarily dihydrate and others primarily tetrahydrate due to separation during quiescent crystallization and solidification, and the masses of the tetrahydrate will liquefy quicker and absorb less moisture in the air conditioning apparatus than will the masses of dihydrate. It is important to provide lumps for this purpose which liquefy solely at the surface and as uniformly as possible at the surfaces of each lump and also that different lumps will liquefy in a similar manner. This requires uniformity of composition and a dense non-porous structure.

The present invention has for an object the overcoming of these difficulties and the production of dense, homogeneous, non-porous lumps of hydrated calcium chloride of the desired shape and size and of a uniform crystalline structure and composition throughout the individual lumps and also in the different lumps. Such lumps may be made in a continuous and substantially automatic manner at low investment and labor costs, and with a minimum percentage of fines which may be automatically separated from the lumps during the process. The lumps may be delivered to receiving or shipping containers in dry form and will not cake together during storage. They exhibit superior resistance to degradation during shipment and handling. The various characteristics cited above make our improved lumps of calcium chloride especially suitable for drying air and other suitable gases.

A method which may be employed in making the lumps is disclosed and claimed in our copending application Serial No. 44,700, and suitable apparatus which may be employed is disclosed in said application and claimed in copending application, Serial No. 223,044 filed August 4, 1938.

As one important feature we form the shaped masses from molten calcium chloride of such water content that the major portion of the calcium chloride is in the form of the dihydrate and a minor portion, or at least an amount not to exceed the amount of the dihydrate, is in the form of the tetrahydrate. The water content is preferably about 28% or within the range of 26% to 30%, the practical outside limits being 25% to 32%. The composition and boiling point for molten calcium chloride of different compositions within these limits is approximately as follows:

| Water content | Percentage of dihydrate | Percentage of tetrahydrate | Boiling point | Saturation temperature |
|---|---|---|---|---|
| Percent | Percent | Percent | °C. | °C. |
| 25 | 96.6 | 3.4 | 175 | 175 |
| 26 | 89.9 | 10.1 | 174 | 174 |
| 27 | 83.1 | 16.9 | 170 | 172.5 |
| 28 | 76.3 | 23.7 | 167.5 | 171 |
| 29 | 69.7 | 30.3 | 165 | 166.5 |
| 30 | 62.8 | 37.2 | 162.5 | 163 |
| 31 | 56.1 | 43.9 | 161 | 160 |
| 32 | 49.4 | 50.6 | 158 | 155 |

A second important feature whereby uniformity of structure, density, shape and size are secured, involves the use of molten calcium chloride hydrate having the desired relative proportions of dihydrate and tetrahydrate as indicated by a boiling temperature. In spite of the divergences shown in the values of the boiling point and saturation temperature columns of the table, to obtain, as we do, a given percentage of calcium chloride in the molten material, we superheat the molten material to a boiling temperature of about 172° C. in a heater open to usual atmospheric pressures to produce a product of approximately 28% water, with a preferable temperature range of the boiling superheated solution of 168° C. to 174° C. to produce a product of approximately 30% to 26% water. The outside practical limits are 158° C. to 175° C. Thus, we control the composition of our product by fixing the boiling temperatures of the superheated liquid in the heater close to but preferably above the saturation temperatures. The desired temperature and concentration for the molten material is obtained either by boiling a dilute solution of calcium chloride until the requisite water is evaporated and the temperature raised to the desired point, or by adding calcium chloride monohydrate or calcium chloride dihydrate, or a mixture thereof readily obtainable in flake form, to the dilute solution until the concentration and the boiling point desired is reached. If the boiling temperature should be too high for any reason, it is diluted by adding water or preferably by adding a more dilute calcium chloride solution in sufficient amount to reduce the boiling temperature to that desired.

This molten material may be withdrawn from the heater through a closed conduit which prevents any further evaporation of water or change in composition. While flowing through said conduit, the temperature is progressively lowered to about 160° C. and the mass is continuously agitated during the crystal formation in the conduit. At a temperature of about 160° C. a major portion of the dihydrate will have separated in the form of fine crystals, the fineness of the crystals being due, in part, to the agitation during the cooling. The cooling not only lowers the temperature of the stream flowing through the conduit but also abstracts the heat of crystallization.

The material discharged from the end of the conduit at about 160° C. is of a mushy consistency made up primarily of calcium chloride dihydrate crystals but there will be sufficient calcium chloride tetrahydrate in liquid form to permit free relative movement of the crystals so as to avoid form-retaining hardness. The temperatures should be such in respect to the composition employed that the mushy mixture delivered from the conduit is not so stiff as to cause liability of plugging of the conduit, and is sufficiently free flowing to permit it to be delivered into molds of the size and shape of the desired lumps or masses, or to progressively form a continuous bar on a conveyor moving at the proper speed beneath the delivery nozzle, which bar may be subdivided into the desired sections after relatively slight further cooling and comparatively close to the nozzle outlet. The temperature and composition should be such that upon further cooling a very few degrees, there will be sufficient crystallization of the remaining liquid to give the masses form-retaining hardness. Thus, from the time the material leaves the agitator until there is form-retaining hardness, there will be no settling or separation of the crystals from the liquid and the product will be homogeneous. The cooling may then be continued until the material reaches atmospheric temperature, at which time the blocks, cakes, or lumps of predetermined shape and size will be sufficiently hard to permit comparatively rough handling without liability of breaking or chipping.

We do not wish to be limited to any particular dimensions for the lumps but for dehydration of a current of air or other gas, it has been found that lumps having average dimensions of between one and two inches operate very satisfactorily, and when piled up in a dehumidifying apparatus, leave adequate spaces through which a current of gas may be delivered.

By the forming of our improved product in the manner above described and of the composition referred to, the amount of liquid between the crystals of dihydrate at the time the agitation ceases and the mushy mass is discharged as the cooled and agitated stream will be such that upon solidifying, it will form a matrix, primarily of the tetrahydrate, which cements together the crystals of dihydrate. This matrix is in sufficiently thin layers between adjacent or nearly contacting dihydrate crystals that when the product is subjected to the action of water or a moist gas, the moisture absorption and resulting liquefaction takes place substantially uniformly over the surfaces of the lumps or blocks in spite of the fact that the tetrahydrate would normally tend to liquefy before the dihydrate. This uniformity of surface melting or liquefaction is an important distinction from lumps or blocks directly cast from the molten material. When the molten material, even though it be of the composition which we prefer to employ, is poured directly into molds, the dihydrate will crystallize first as a shell or outer layer within the mold, and the tetrahydrate will crystallize last and usually at the center section of the lump or block, namely, at a point furthest removed from a heat abstracting surface, so that when the block is subjected to the action of water or moisture, the tetrahydrate upon liquefying, will cause the formation of large cavities, pits, or pipes in the block, and the resulting honeycombed blocks will have their strength so reduced that the under ones in a pile are liable to be crushed to smaller fragments by the superposed lumps or blocks.

It is preferable that the blocks be deodorizing as well as dehumidifying. For this purpose it is preferable to incorporate a relatively small amount of activated carbon in the bath of molten material and stirred in so that the activated carbon will be uniformly dispersed throughout the mass.

Having thus described our invention, what we claim as new and desire to secure by Letters Patent is:

1. As an article of manufacture, a molded shape of hydrated calcium chloride containing not more than 32% and not less than 25% of water of crystallization, having a structure of very fine crystals of calcium chloride dihydrate of substantially uniform size both on its surface and throughout its mass, said fine crystals being cemented together into a dense and non-porous body by calcium chloride tetrahydrate.

2. As articles of manufacture, formed lumps of hydrated calcium chloride free from shrinkage cavities and non-porous comprising finely divided crystals of calcium chloride dihydrate uniformly distributed through a solidified matrix of calcium chloride tetrahydrate, the average calcium chloride content of the lumps being within the range of 68% to 75%.

3. As an article of manufacture, a molded shape of hydrated calcium chloride containing from 50% to 95% calcium chloride dihydrate in the form of very fine crystals of substantially uniform size and distributed throughout its mass, said fine crystals being cemented together into a dense non-porous body by a matrix of calcium chloride tetrahydrate.

4. A dense and non-porous lump of hydrated calcium chloride for use in air dehydration, consisting of a multiplicity of fine discreet crystals of $CaCl_2, 2H_2O$, substantially uniformly dispersed throughout the lump and bound together in a matrix of $CaCl_2, 4H_2O$, said matrix comprising approximately 20% to 30% of the lump, and the total calcium chloride content being approximately 72% of the lump and the layers of matrix between the crystals being sufficiently thin to prevent any substantial selective deliquescence or dissolving thereof when the lump is exposed to water or moisture.

5. A dense and non-porous lump of hydrated calcium chloride for use in air dehydration, consisting of a multiplicity of fine discreet crystals of $CaCl_2, 2H_2O$, substantially uniformly dispersed throughout the lump and bound together in a matrix of $CaCl_2, 4H_2O$, said matrix comprising not to exceed 50% of the lump, and the total calcium chloride content being between 68% and 75% of the lump and the layers of matrix between the crystals being sufficiently thin to prevent any substantial selective deliquescence or dissolving thereof when the lump is exposed to water or moisture.

6. A dense and non-porous lump of hydrated calcium chloride containing approximately 70% to 80% of $CaCl_2.2H_2O$ and 20% to 30% of $CaCl_2.4H_2O$, the total $CaCl_2$ content being approximately 72% of the lump, both the dihydrate and the tetrahydrate being substantially uniformly distributed throughout the lump whereby the lump upon exposure to a current of moist air will liquefy solely at its external surfaces and at a substantially uniform rate on said surfaces.

CHARLES R. DOWNS.
JOSEPH W. SPISELMAN.